(12) United States Patent  
Nguyen

(10) Patent No.: US 9,224,018 B1
(45) Date of Patent: Dec. 29, 2015

(54) SWIPE-GUIDE FOR CARD READER

(71) Applicant: Square, Inc., San Francisco, CA (US)

(72) Inventor: Anthony Nguyen, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/464,592

(22) Filed: Aug. 20, 2014

(51) Int. Cl.
*G06K 7/00* (2006.01)
*G06K 7/015* (2006.01)

(52) U.S. Cl.
CPC .............. *G06K 7/015* (2013.01); *G06K 7/0004* (2013.01)

(58) Field of Classification Search
USPC ................... 235/440, 380, 375, 439, 435, 449
See application file for complete search history.

(56) References Cited

U.S. PATENT DOCUMENTS

| | | | |
|---|---|---|---|
| 5,641,295 A | 6/1997 | Koyama | |
| 5,653,610 A | 8/1997 | Broschard, III | |
| 5,775,937 A | 7/1998 | Bricaud et al. | |
| 5,929,427 A * | 7/1999 | Harada et al. ................. | 235/492 |
| 5,984,183 A | 11/1999 | Moriya | |
| D425,486 S | 5/2000 | Nishio et al. | |
| D434,732 S | 12/2000 | Wu | |
| D454,875 S | 3/2002 | McDowell et al. | |
| D483,372 S | 12/2003 | Watanabe et al. | |
| D485,840 S | 1/2004 | Yokoyama | |
| D509,191 S | 9/2005 | Hu et al. | |
| D521,453 S | 5/2006 | Takagi et al. | |
| D580,438 S | 11/2008 | Kuchler | |
| D680,537 S | 4/2013 | Miller et al. | |
| D686,208 S | 7/2013 | Miller et al. | |
| D719,159 S | 12/2014 | Nguyen | |
| 2014/0203082 A1* | 7/2014 | Huh ............................... | 235/440 |
| 2014/0297540 A1* | 10/2014 | Swamy et al. .................. | 705/71 |

OTHER PUBLICATIONS

Notice of Allowance mailed Aug. 6, 2014, for U.S. Appl. No. 29/494,137, of Nguyen, A., filed Jun. 17, 2014.

* cited by examiner

*Primary Examiner* — Edwyn Labaze
(74) *Attorney, Agent, or Firm* — Novak Druce Connolly Bove + Quigg LLP

(57) ABSTRACT

Aspects of the technology relate to a swipe-guide attachment for use with a mobile card reader. In some aspects, the swipe-guide attachment is configured to facilitate insertion of a payment card into the card reader and prevent rotation of the card reader. A swipe-guide may include a harness for enclosing the card reader, and can include an aperture, for example, to permit passage of an audio plug of the card reader into a headphone port of a host mobile device.

19 Claims, 5 Drawing Sheets

SWIPE-GUIDE FOR CARD READER

BACKGROUND

1. Technical Field

The subject application relates to a guide for a card reader and in particular, a swipe guide for guiding the insertion of a financial payment card into a card reader.

2. Introduction

The increasing prevalence of mobile computing devices, such as smartphones and tablet computers has spurred an increase in popularity for attachable peripheral devices. In some instances, attachable card readers can be used in conjunction with a host device, such as a smartphone, e.g., for use as a mobile point-of-sale (POS) terminal. In some such configurations, the card reader can be coupled to the smartphone by inserting a plug of the card reader into a headphone port of the smartphone.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it is clear and apparent that the subject technology is not limited to the specific details set forth herein and may be practiced without these specific details. In some instances, structures and components are shown in block diagram form in order to avoid obscuring the concepts of the subject technology.

In some card reader implementations, a card reader attachment is supported by a host device (such as a smartphone), via an audio coupling. Depending on the card reader configuration, the card reader can be coupled to the smartphone via an audio plug, such as a 3.5 mm headphone jack e.g., a 3.5 mm tip-ring-ring-sleeve (TRRS) headphone jack.

Card reader attachments can be configured to read various financial card payment types and/or data formats. For example, card readers can be configured to read magnetic stripe payment cards and/or integrated circuit (IC) payment cards, such as those conforming to the Europay, MasterCard and Visa (EMV) standard.

Due to the small form factor typically required of mobile card reader devices, insertion slots for different payment card types are proximately located, and can be hard to visually distinguish by a user attempting to swipe/dip a payment card. Additionally, in some implementations, a cylindrical shape of the audio plug (i.e., that couples the card reader to the mobile device) can allow the reader to move or rotate, making use of the card reader cumbersome to a user attempting to repeatedly swipe (or dip) financial payment cards.

Aspects of the technology address the foregoing issues by providing a swipe-guide for a card reader configured to facilitate swiping/dipping of a financial payment card. In some implementations, a swipe-guide may further include visual features that help a user distinguish a swipe slot from a dip slot, and to prevent inadvertent rotation of the card reader.

Figure 1:
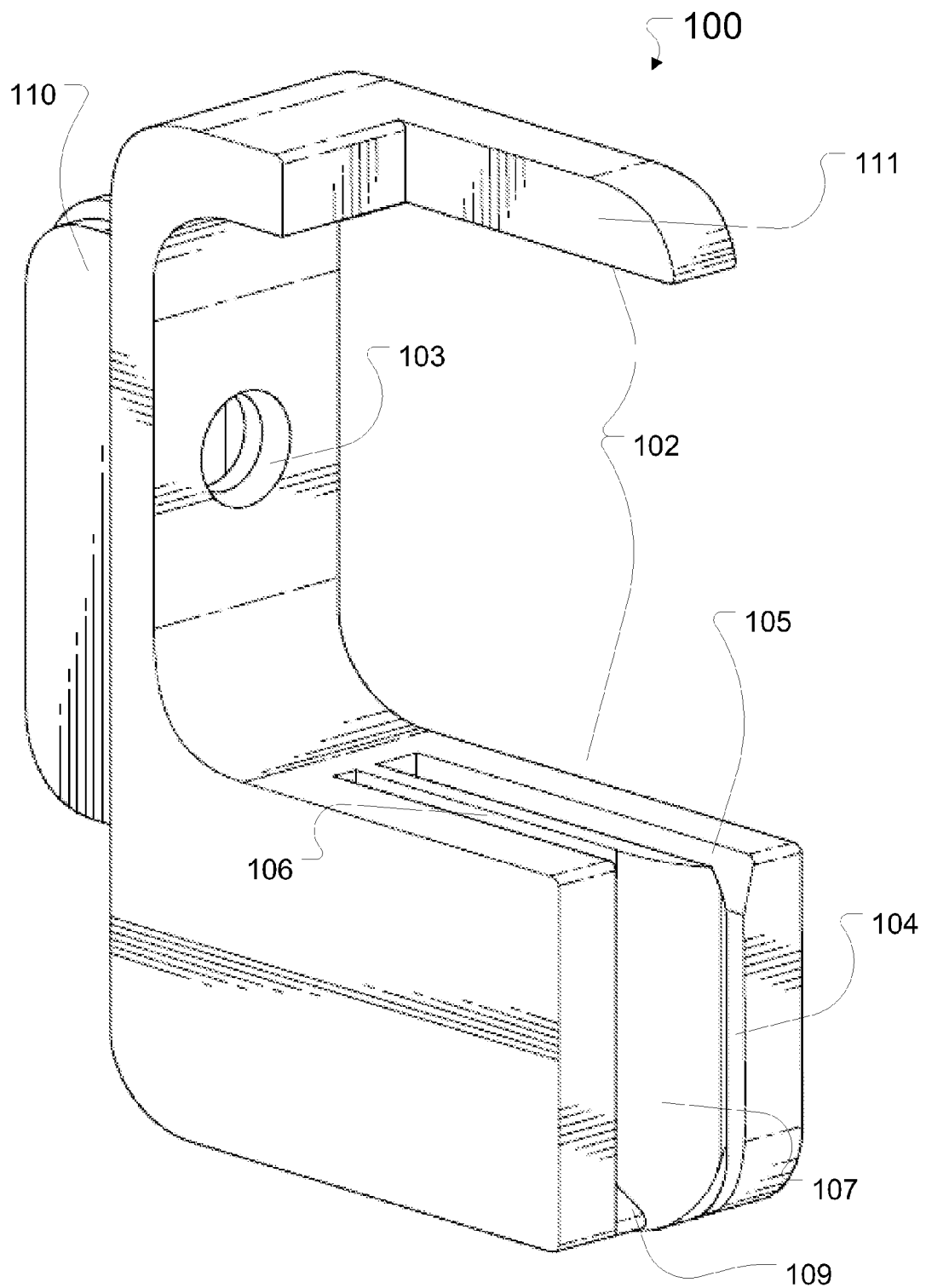
FIG. 1 illustrates an example of a swipe-guide attachment, according to some aspects of the technology.

FIG. 1 illustrates an example of a swipe-guide attachment 100, according to some aspects of the disclosure. In the example of FIG. 1, swipe-guide attachment 100 includes harness 102, including plug aperture 103. Swipe-guide attachment 100 also includes first extension slot 104, including first guide 105, and second extension slot 106, including second guide 107 and dip-card rail 109. In certain aspects, swipe-guide attachment 100 further includes flange 110 and guide 111.

In practice, swipe-guide attachment 100 can be used to receive and retain a card reader (not illustrated) within harness 102. The card reader retained by harness 102 can include an audio plug (e.g., a headphone plug) that can be inserted through aperture 103 e.g., for coupling with a mobile host device, such as a smartphone or tablet computer.

As discussed in further detail below, a card reader retained within swipe-guide attachment 100 can be prevented from unintentional rotation or movement, for example, with respect to the device, during use of the card reader. Additionally, first extension slot 104 (including first guide 105) and second extension slot 106 (including second guide 107) can help facilitate swiping or insertion of a financial payment into card reader.

In some configurations, visual indicators disposed on swipe-guide attachment 100 may be used to facilitate the swiping and/or dipping of a financial payment card into a card reader. By way of example, a surface of guide 111 can provide a visual feature that allows a user to identify a location of a magnetic card slot in the card reader (e.g., in alignment with first extension slot 104). Similarly, second guide 107 of second extension slot 106 can provide a visual indicator, for example, marking the location of a dip slot of the card reader.

As discussed in further detail below, in some aspects, second extension slot 106 can further include dip-card rail 109 to facilitate the alignment of a dip-type payment card into a card reader.

Figure 2:
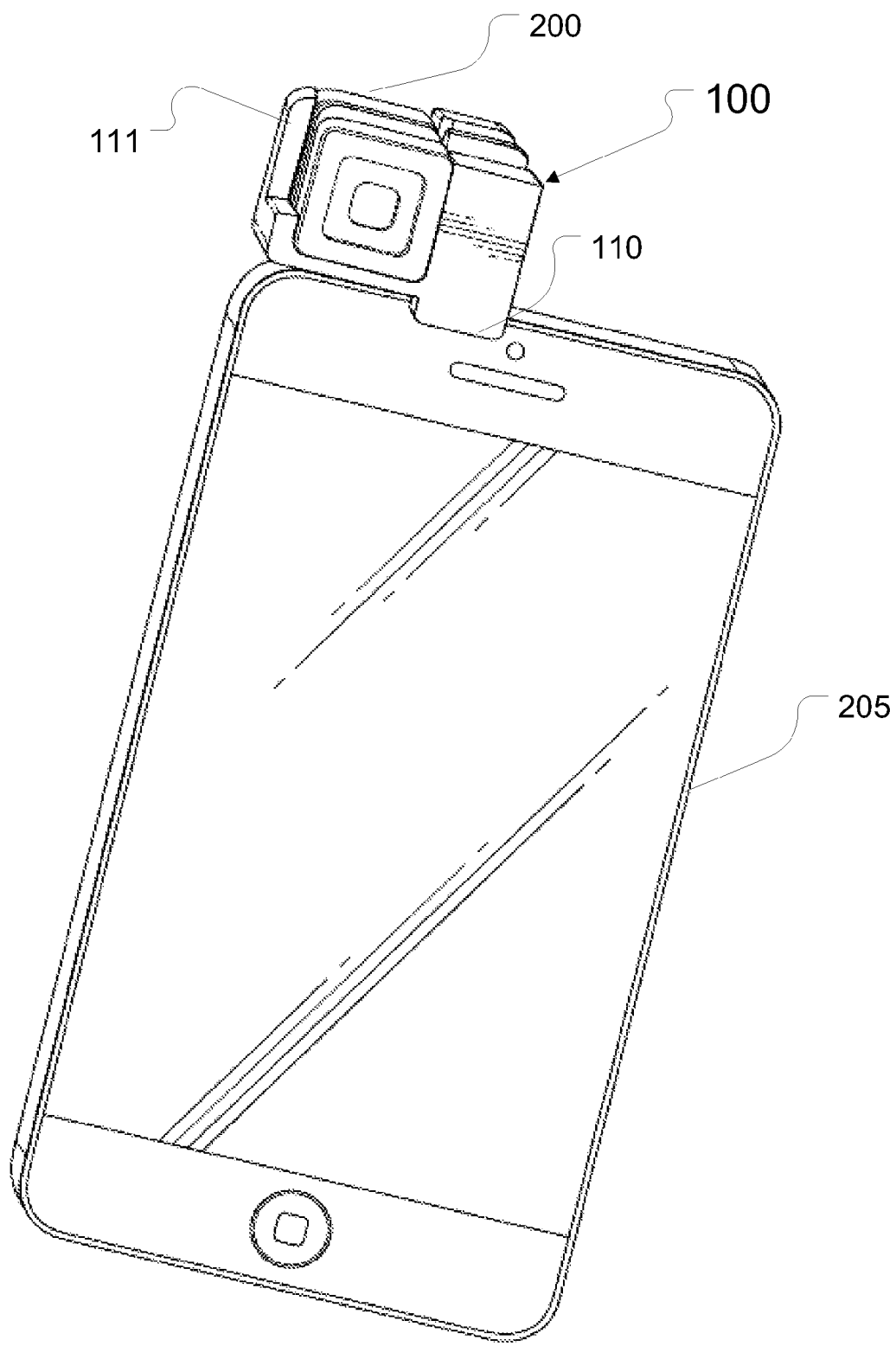
FIG. 2 illustrates an example of a swipe-guide attachment containing a card reader, according to some implementations.

FIG. 2 illustrates an example of a swipe-guide attachment (e.g., swipe-guide attachment 100) containing card reader 200, as used with a mobile device 205. In the example illustrated in FIG. 2, mobile device 205 is a smartphone; however, it is understood that mobile device 205 can include any processor-based mobile device to which a card reader may be physically and/or communicatively coupled. By way of example, mobile device 205 may include a tablet computer, a laptop computer, a personal computer (PC), a portable desktop assistant (PDA), or the like.

When used in conjunction with mobile device 205, swipe-guide attachment 100 provides mechanical support for the enclosed card reader 200. For example, flange 110 can be configured to rest against an edge or surface of mobile device 205, preventing rotation of card reader 200 when a financial payment card is swiped/inserted into card reader 200. It is understood that various flange configurations may be implemented without departing from the scope of the invention. For example, flange 110 may be differently situated on swipe-guide attachment 100. Alternatively, more than one flange may be used, depending on the desired implementation.

In addition, the card guides (e.g., first guide 105 and second guide 107) can facilitate the swiping/dipping of a payment card into card reader 200. That is, first guide 105 can provide a visual indication of a location of a card slot (e.g. first extension slot 104), that is in alignment with a swipe slot of card reader 200. Similarly, second guide 107 provides a visual indication of a second extension slot (e.g. second extension slot 106) in alignment with a dip slot of card reader 200.

As discussed in further detail below, alignment between the various card slots provided by swipe-guide attachment 100 and those of card reader 200 can facilitate the insertion/swiping of a financial payment card into card reader 200.

Figure 3:
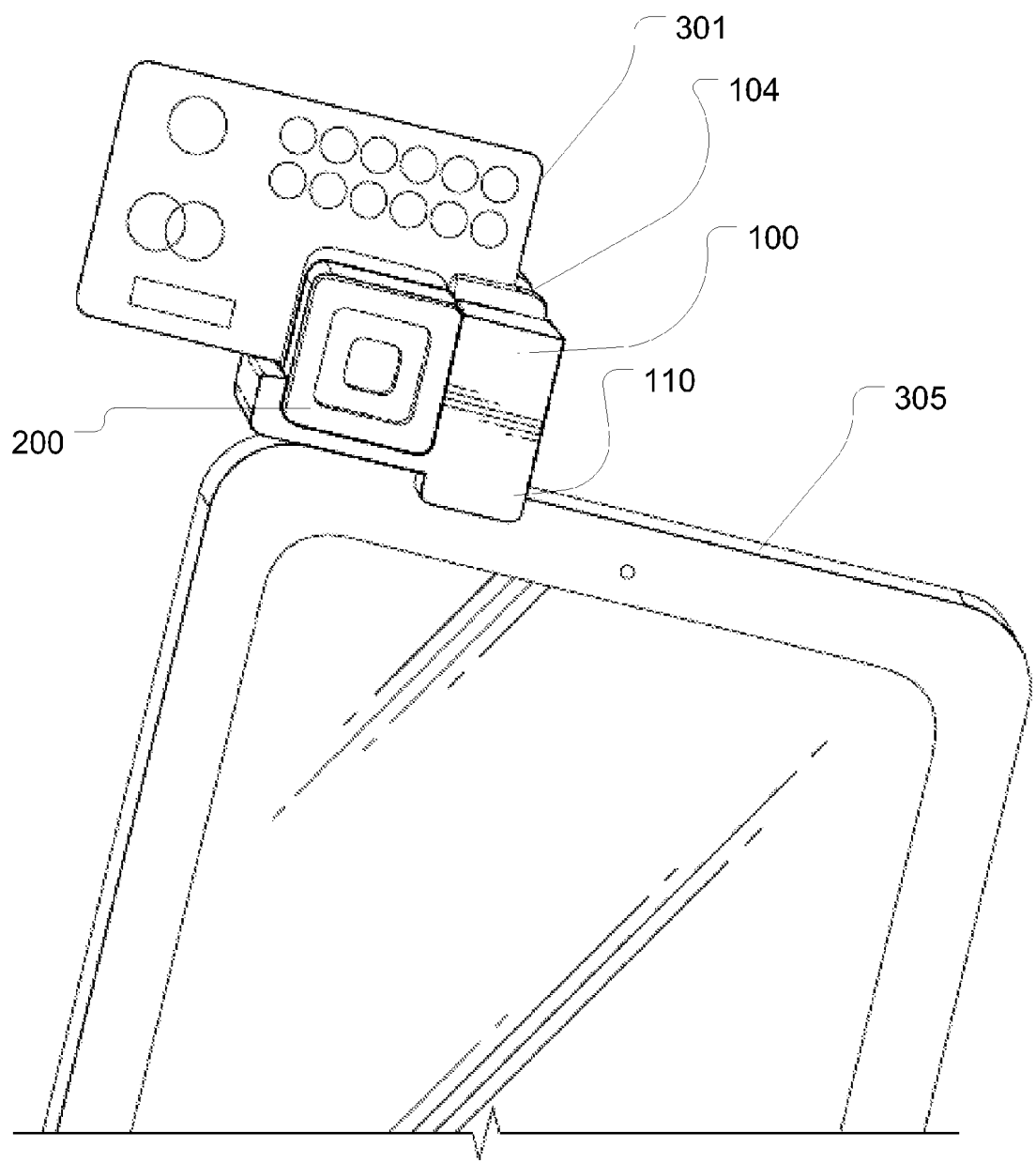
FIG. 3 illustrates an example implementation of a swipe-guide attachment, as used to facilitate swiping of a magnetic stripe payment card, according to some aspects of the technology.

FIG. 3 illustrates an example implementation of a swipe-guide attachment (e.g., swipe-guide attachment 100), as used to facilitate swiping of a magnetic stripe payment card 301, according to some implementations of the technology.

As illustrated in the example of FIG. 3, a swipe-guide attachment (e.g., swipe-guide attachment 100), including a card reader (e.g., card reader 200), is coupled to a mobile host device (e.g., tablet computer 305). In practice, a first guide (first guide 105) can be configured to provide a sloped edge or opening to first extension slot 104, to facilitate insertion of a payment card through first extension slot 104 of swipe-guide attachment 100 and into a card reader within a harness. In some configurations, first extension slot 104 is aligned with a magnetic stripe card slot of card reader 200, such that a financial payment card swiped through first extension slot 104 is guided into (and through) card reader 200.

In some implementations, first guide 105 can also provide a visual indication (e.g., to a user facing a screen of mobile device 305), to indicate where first extension slot 104 is located. Such visual indications can simplify operation of card reader 200, for example, by making it easier for the user to swipe a magnetic stripe payment card.

In yet another implementation, a swipe-guide attachment of the subject technology can facilitate use of a mobile card reader by preventing unintended movement or rotation of the card reader. A flange, such as flange 110, can be employed for this purpose, and adapted to rest against an edge or surface of the mobile host device, such as a front surface of mobile device 205, to prevent rotation of the swipe-guide as the user dips or swipes payment cards into the card reader. Although flange 110 is shown as coupled to a bottom-right edge of swipe-guide attachment 100, it is understood that the use of a flange (e.g., flange 110) is not limited to example illustrated in FIG. 3. By way of example, a flange of different shapes, or attachment locations on swipe-guide attachment 100, may be implemented.

Figure 4:
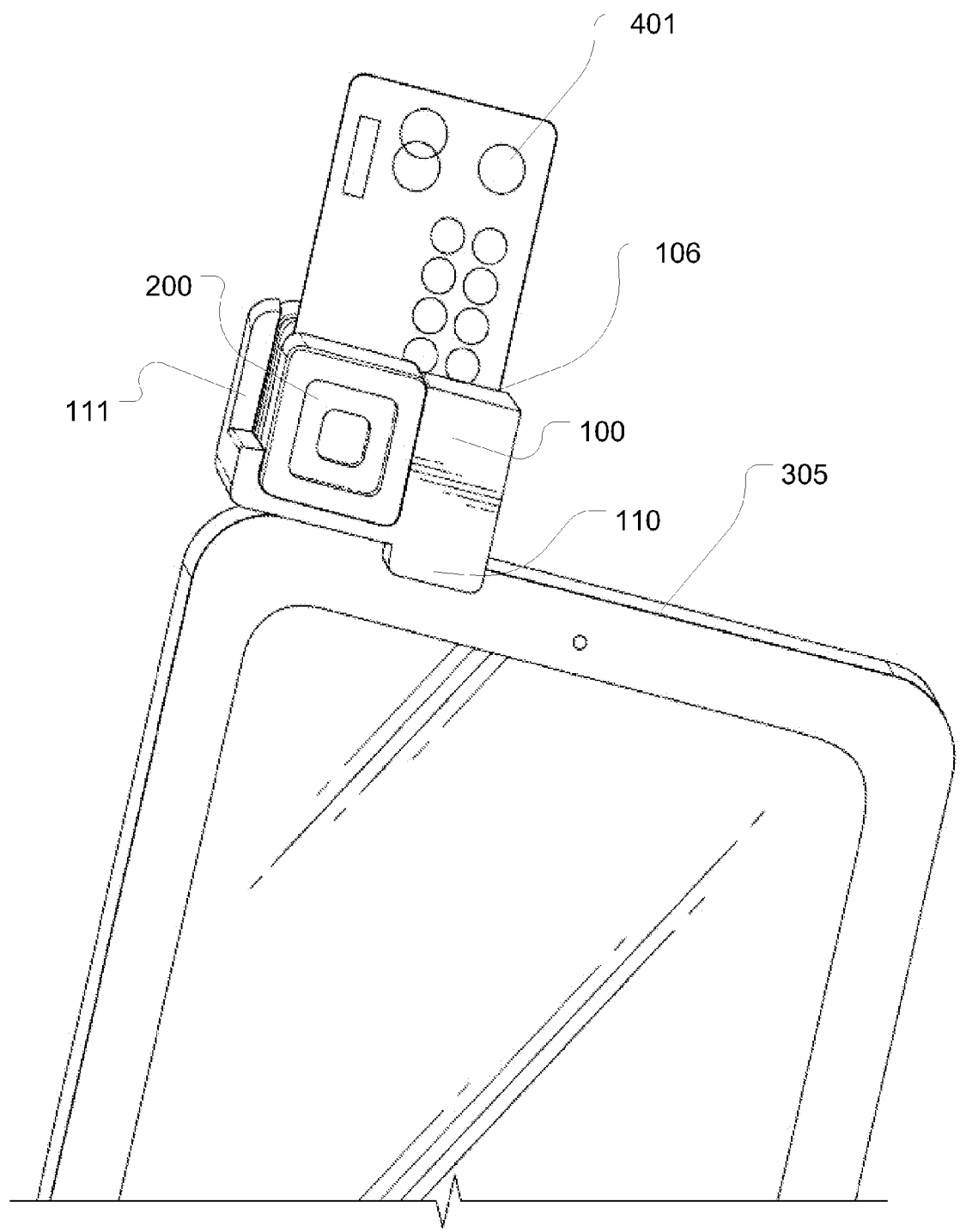
FIG. 4 illustrates an example of a swipe-guide attachment, as used to facilitate dipping of an integrated circuit (IC) payment card, according to some aspects of the technology.

FIG. 4 illustrates an example implementation of a swipe-guide attachment (e.g., swipe-guide attachment 100), as used to facilitate dipping of an integrated circuit (IC) payment card 401, according to some implementations of the technology.

As illustrated, a swipe-guide attachment (e.g., swipe-guide attachment 100), including card reader 200, is coupled to a mobile host device, such as tablet computer 305. In practice, a second guide (e.g., second guide 107) facilitates insertion of an IC payment card 401 through a second extension slot (e.g., second extension slot 106) of swipe-guide attachment 100 and into card reader 200. Second extension slot 106 can be aligned with a dip card slot of card reader 200, such that IC payment card 401, when dipped into second extension slot 106, is guided into a corresponding dip slot of card reader 200.

To further facilitate the dipping of IC payment card 401, second extension slot 106 can include a dip-card rail (not shown), such as, dip-card rail 109 as discussed above with respect to FIG. 1. In some aspects, card reader 200 can include a corresponding dip-card rail within the card reader's dip slot, such that an IC payment card is guided into the dip slot of card reader 200, between opposing dip-card rails. It is understood, that dip-card rails may be provided in different configurations, depending on the design implementation. For example, one or two dip-card rail/s may be used. Alternatively, in some implementations, a dip-slot may be configured without any dip-card rail/s.

Similar to first guide 105, second guide 107 can also provide a visual indication (e.g., to a user facing a screen of mobile device 205), to indicate a location of second extension slot 106, facilitating insertion of a financial payment card into a second extension slot (e.g., second extension slot 106).

Figure 5:
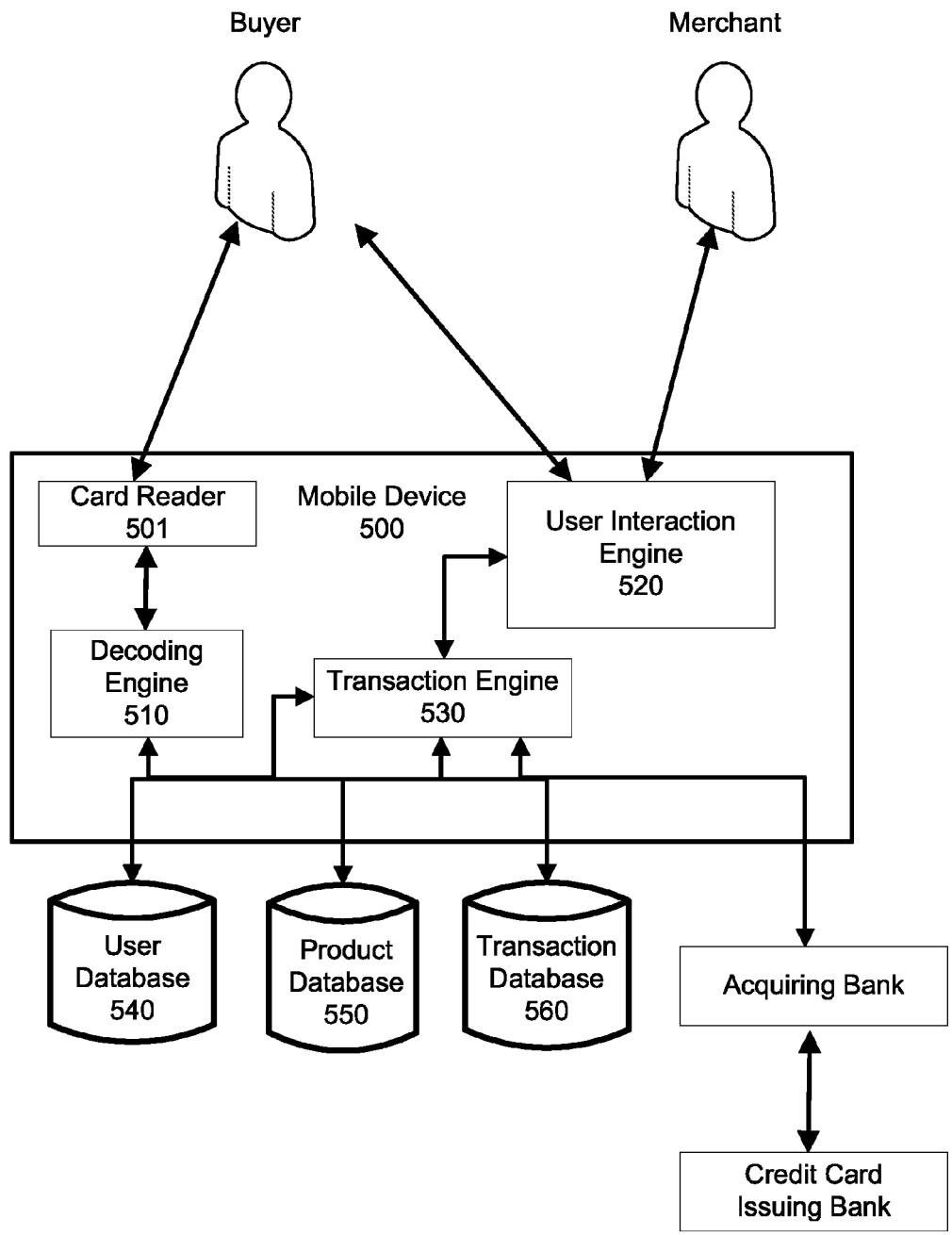
FIG. 5 conceptually illustrates an example environment in which a card reader can be used to facilitate a financial transaction between a buyer and a merchant.

FIG. 5 illustrates an example environment in which a swipe-guide and card reader may be used. It will be apparent that the components portrayed in the environment of FIG. 5 can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 5, the system includes a mobile device 500, a reader 501 connected to mobile device 500, a decoding engine 510, a user interaction engine 520, and a transaction engine 530, all running on mobile device 500. Additionally, the system may also include one or more of a user database 540, a product or service database 550, and a transaction database 560, all coupled to the transaction engine 530.

Consistent with aspects of the subject technology, reader 501 can be physically integrated with a swipe-guide attachment, such as that discussed above with respect to FIGS. 1-4.

As used herein, the term engine can refer to software, firmware, hardware, and/or other components used to effectuate a purpose. The engine will typically include software instructions that are stored in non-volatile memory (also referred to as second memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically involves the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 5, mobile device 500 to which reader 501 is connected can be, but is not limited to, a cell phone, such as Apple's iPhone, other portable electronic devices, such as Apple's iPod Touch, Apple's iPad, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 500 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 530 running on mobile device 500. In response to a financial transaction between a buyer and a seller, mobile device 500 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 5, reader 501 is configured to read data encoded in either a magnetic strip (or IC) of a card being swiped by a buyer and send a signal that corresponds to the data read to mobile device 500. However, as discussed above, reader 501 is configured to receive various payment card types, including but not limited to IC cards that can be provided to reader 501 using a dip-slot.

The size of reader 501 can be miniaturized to be portable for connection with mobile device 500. For example, the size of card reader 501 can be miniaturized to an overall length of less than 1.5". In addition, the miniaturized card reader 501 is also designed to reliably read the card with minimum error via a single swipe by counteracting vendor specific filtering done by mobile device 500. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A mobile point-of-sale (POS) system comprising a card reader and a swipe-guide attachment, the swipe-guide attachment configured to facilitate insertion of a payment card into the card reader and to prevent rotation of the card reader, the swipe-guide attachment comprising:
   a harness configured for enclosing at least three sides of the card reader, the harness comprising a plug-aperture adapted for permitting passage of an audio plug of the card reader through the harness and into a headphone port of a host mobile device to enable communication between the card reader and the host mobile device;
   a flange coupled to a bottom edge of the harness, wherein the flange is configured to mechanically couple with a surface of the host mobile device to prevent rotation of the swipe-guide attachment with respect to the host mobile device;
   a first extension slot adjacently attached to the harness, wherein the first extension slot comprises a first guide disposed on an edge of the first extension slot, wherein the first guide is configured to facilitate swiping of a magnetic stripe payment card through the card reader by guiding the magnetic stripe payment card into a magnetic card track of the card reader;
   a second extension slot adjacently attached to the harness, wherein the second extension slot comprises a second guide disposed on an edge of the second extension slot, and wherein the second guide is configured to facilitate dipping of an integrated circuit (IC) payment card into the card reader by guiding the IC payment card into a dip slot of the card reader;
   a first visual indicator disposed on the harness, the first visual indicator configured to provide a visual depth indication to an operator before swiping the magnetic stripe payment card through the magnetic card track of the card reader; and
   a second visual indicator disposed on the second guide, the second visual indicator configured to provide a visual depth indication to an operator when dipping the IC payment card into the dip slot of the card reader.

2. The mobile POS system of claim 1, wherein the first extension slot is configured to align with the magnetic card track and the second extension slot is configured to align with the dip slot.

3. The mobile POS system of claim 1, wherein the flange is disposed on a front side of the harness.

4. The mobile POS system of claim 1, wherein the plug-aperture is adapted for permitting passage of a headphone jack.

5. A swipe-guide attachment comprising:
a harness configured for receiving a mobile card reader;
a first extension slot adjacently attached to the harness, wherein the first extension slot comprises a first guide disposed on an edge of the first extension slot;
a second extension slot adjacently attached to the harness, wherein the second extension slot is parallel with the first extension slot and comprises a second guide disposed on an edge of the second extension slot; and
a flange disposed on an outer edge of the swipe-guide attachment, wherein the flange is configured to mechanically engage a host mobile device to prevent rotation of the mobile card reader when the mobile card reader is coupled to a host mobile device.

6. The swipe-guide attachment of claim 5, wherein the harness further comprises:
a plug-aperture configured to permit passage of an audio plug of the card reader through the harness and into a headphone port of a host mobile device.

7. The swipe-guide attachment of claim 6, wherein the plug-aperture is adapted for permitting passage of a headphone jack.

8. The swipe-guide attachment of claim 5, wherein the first guide is configured to align with a swipe slot of the card reader to facilitate swiping of a financial payment card through the card reader.

9. The swipe-guide attachment of claim 5, wherein the second guide is configured to align with a dip slot of the card reader to facilitate dipping of a financial payment card into the card reader.

10. The swipe-guide attachment of claim 5, wherein the second guide is perpendicular to the first guide.

11. The swipe-guide attachment of claim 8, wherein the financial payment card is a magnetic stripe payment card.

12. The swipe-guide attachment of claim 9, wherein the financial payment card is an integrated circuit (IC) payment card.

13. A swipe-guide attachment comprising:
a harness configured for receiving a mobile card reader, wherein the harness comprises a first indicator to mark a location of alignment with a first extension slot that is adjacently attached to the harness;
a second extension slot adjacently attached to the harness, wherein the second extension slot comprises a second indicator disposed on an edge of the second extension slot; and
a flange disposed on an outer edge of the swipe-guide attachment, wherein the flange is configured to mechanically engage a host mobile device to prevent rotation of the mobile card reader when the mobile card reader is coupled to the host mobile device.

14. The swipe-guide attachment of claim 13, wherein the first extension slot is adjacent to a magnetic stripe reader of a card reader device.

15. The swipe-guide attachment of claim 13, wherein the second indicator is configured to provide a visual indication of a location of the second extension slot.

16. The swipe-guide attachment of claim 13, wherein the first extension slot is configured to align with a magnetic stripe reader of a card reader device.

17. The swipe-guide attachment of claim 13, wherein the second extension slot is configured to align with an integrated circuit (IC) reader of a card reader device.

18. The swipe-guide attachment of claim 13, wherein the harness further comprises an aperture configured to permit passage of an audio plug.

19. A swipe-guide attachment comprising:
a harness;
a first extension slot adjacently attached to the harness, wherein the first extension slot comprises a first indicator disposed on an edge of the first extension slot; and
a second extension slot adjacently attached to the harness, wherein the second extension slot is parallel with the first extension slot and comprises a second indicator disposed on an edge of the second extension slot; and
a flange disposed on an outer edge of the swipe-guide attachment, wherein the flange is configured to mechanically engage a host mobile device to prevent rotation of the swipe-guide attachment when the swipe-guide attachment is coupled to the host mobile device.

\* \* \* \* \*